Sept. 2, 1969 W. B. NOBLE 3,464,072
THREAD FORM RESTORING TOOL
Filed Nov. 7, 1966 2 Sheets-Sheet 1

Wiley B. Noble
INVENTOR.

BY Bertram A. Mann
ATTORNEY

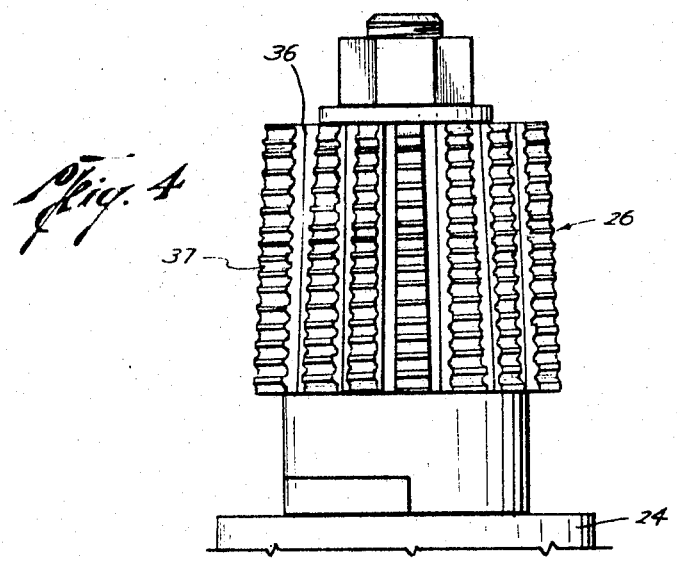
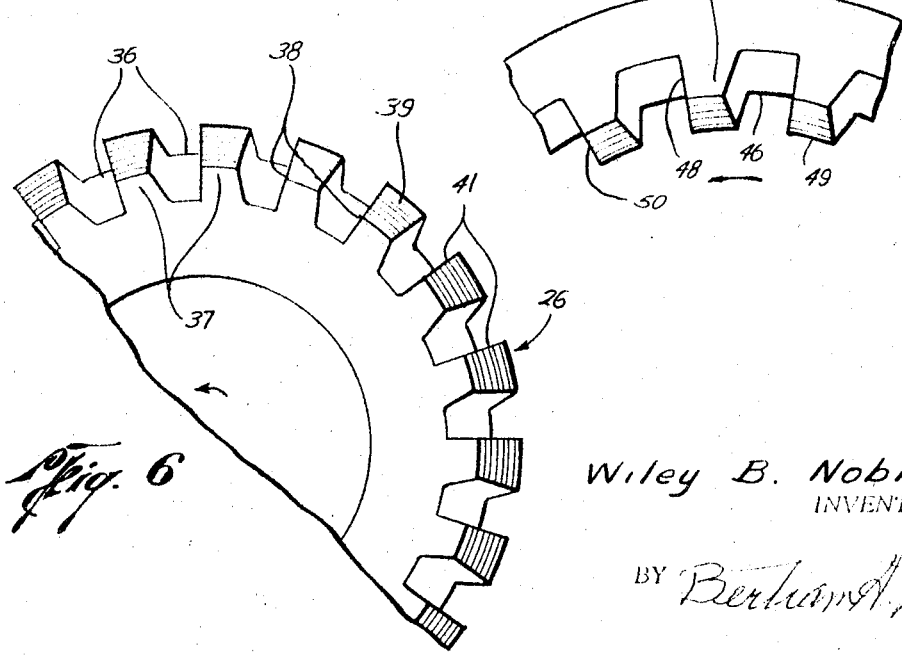
Wiley B. Noble
INVENTOR.

United States Patent Office 3,464,072
Patented Sept. 2, 1969

3,464,072
THREAD FORM RESTORING TOOL
Wiley B. Noble, Houston, Tex., assignor, by mesne assignments, to Herman J. Schellstede, New Iberia, La.
Filed Nov. 7, 1966, Ser. No. 592,598
Int. Cl. B23g 1/06
U.S. Cl. 10—1
3 Claims

ABSTRACT OF THE DISCLOSURE

A tool for reforming threads as of a drill pipe tool joint, including a threaded surface conforming in profile with the mating thread of the thread to be reformed and axial slots therein forming thread lands. One wall of each slot is radial and forms with the thread surface a scarfing edge without rake or following clearance.

---

This invention relates to thread form restoring tools and consists particularly in a novel restoring tool for drill pipe tool joints, both male and female.

After drill pipe has been used for a long period of time, its tool joints become worn and damaged both in the threads and the thickened tubular walls. Heretofore, the usual practice in renewing a drill string has been to remove damaged and worn tool joints and install new joints at the ends of the pipe. Substantial expense might be saved by repairing the old joints, particularly the threads thereof. However, previous thread restoring devices, particularly those provided for steel tool joints, generally have utilized thread cutting tools, as dies and taps, usually involving chasers resiliently presented to the thread being repaired. Such devices are operated by lathes and, generally, while cutting a small additional thread, are ineffective to remove the burrs or other fortuitous protrusions from badly damaged pipe or tool joint threads. Moreover, it is desirable so far as possible to preserve the hardened thread flanks of the used tool joint, but previous thread repairers, being thread cutters, generally remove at least a small portion of the original thread surface because it is practically impossible to stop their cutting action exactly after the removal of burrs but before the cutting of any new thread.

Accordingly, an object of the present invention is to provide a novel thread form restoring device applicable in particular in restoring tool joint threads of drill pipe to their original form.

Another object is to provide a thread restoring tool which requires simply a powered mandrel for rotating the restoring tool and a clamp for rigidly holding the tool joint in position.

Another object is to provide a thread restoring machine with means to insure the halting of the restoring action when burrs and upsets in the threads have been completely removed and before the cutting of any additional thread or of any part of the original, unburred thread surface.

These objects and others hereafter appearing are attained by the structure and apparatus illustrated in the accompanying drawings in which FIG. 1 is a view of a portion of the equipment utilized in applying the present invention;

FIG. 4 is an elevation illustrating a form of the invention as utilized in restoring tool joint box threads;

FIG. 5 is a partial end view of a corresponding tool for restoring tool join pin threads; and FIG. 6 is a partial end view of the tool in FIG. 4 removed from the operating mandrel, the threads being conventionally shown, as in FIG. 5.

Figure 1:
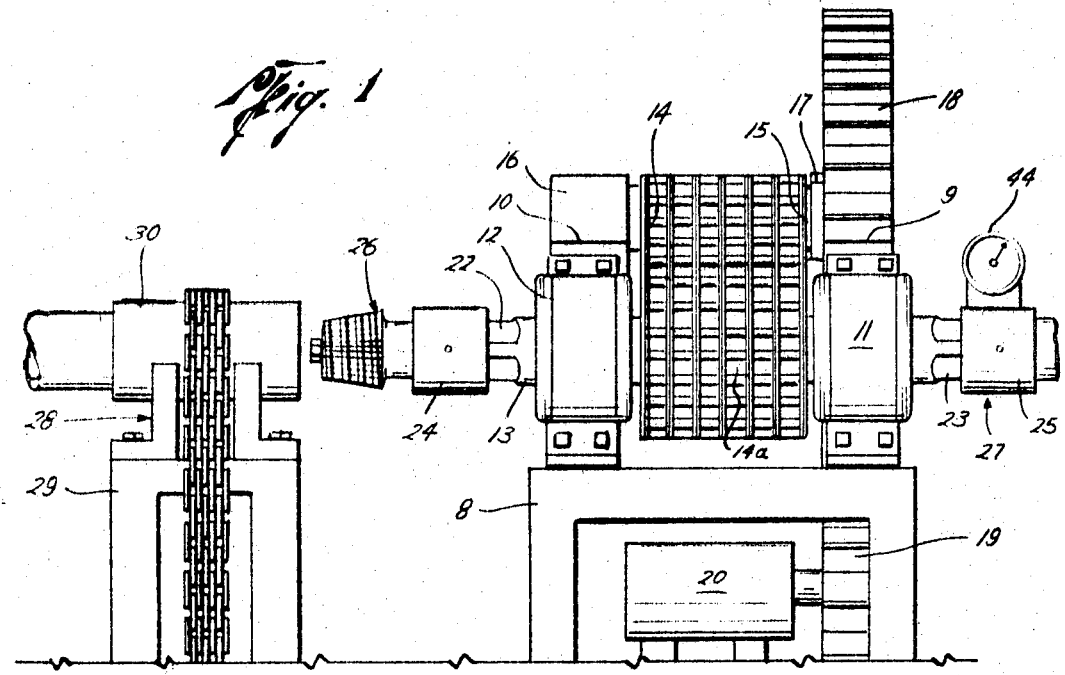

FIG. 1 is a general view of the main parts of the apparatus used in practicing the invention. Projecting above the heavy foundation 8 are posts 9 and 10 to which are secured rugged bearings 11 and 12 rotatably supporting a heavy shaft 13. Between bearings 11 and 12 the shaft is provided with a suitable sprocket 14a for intermeshing with a drive chain 14 extending from a sprocket shaft 15 mounted in suitable bearings 16 and 17 rearwardly of posts 9 and 10. Sprocket shaft 15, at its right end, is rigidly secured to a large gear wheel 18 with the lower portion of which there is meshed a drive pinion 19 operated by a motor 20, either hydraulic or electric or otherwise powered. The arrangement is such as to transmit very high torque at a relatively slow rotational speed to driven shaft 13.

Non-circular portions 22 and 23 are provided on the opposite projecting ends of shaft 13 for non-rotatably fitting the adapter collar portions 24 and 25 on the thread reforming tools, generally designated 26 and 27 and better shown in detail in FIG. 4. While provision is made for mounting the tools at each end of shaft 13, only one end of the shaft may be used at a time or, alternatively, thread reforming tools may be mounted at both ends, as shown, for alternate use in order to speed up the reconditioning of thread forms.

A pipe vise or clamp, generally designated 28, is mounted on a foundation frame 29 for gripping a tool joint, as 30, presented to thread reforming tool 26. In actual practice, the tool joint, in this instance a box or female joint, will be run upon the working portion 37 of tool 26 before being clamped in vise 28.

Figure 2:
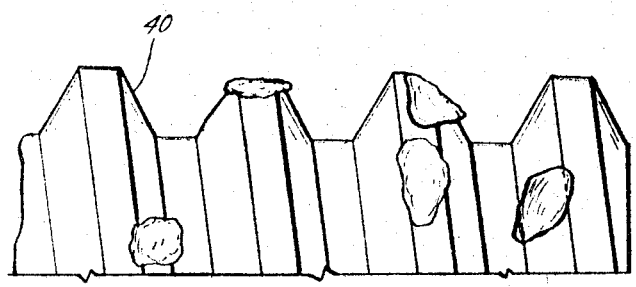
FIG. 2 is an enlarged, partial elevation of a damaged tool joint pin thread.
Figure 3:
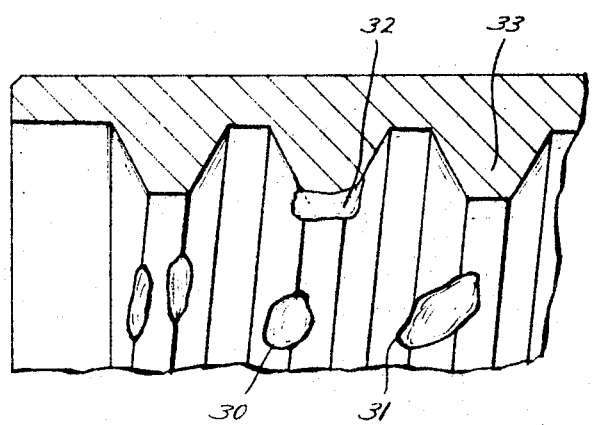
FIG. 3 is an enlarged partial longitudinal section of a damaged tool joint box thread.

FIG. 3 is a greatly enlarged, sectional view of a portion of a tool box joint thread having burred or otherwise damaged portions as at 30, 31, and 32, all of which dent the original profile of the threads in part and in part cause burrs or fortuitous humps on the thread surfaces. FIG. 2 is a partial elevational view showing a damaged pin thread. The reforming tool for operating on a box thread as in FIG. 3 is shown in detail in FIGS. 4 and 6. This tool consists of a working portion provided with male threads which, in size and profile, are the reverse of the threads they are intended to mate with, such as box threads 33 shown in FIG. 3.

However, forming tool 26 is provided with a circumferential series of equally-spaced longitudinal slots 36 forming, in effect, thread lands 37 therebetween. In accordance with the present invention, a relatively large number of such thread lands should be provided—in this instance, twenty—throughout the entire circumference of the forming head, although as few as a dozen or less lands may be provided in some instances. The tool 26 has a right-hand thread, that is, it is intended to move counter-clockwise with respect to FIG. 6, as indicated by the arrow in advancing into a thread to be restored. At the left or forward side of each land 37 during advancement into a thread (FIG. 6) there is a radial face 38 which intercepts threaded circumferential surface 39 of the land to form a longitudinal scarfing edge which assumes the reverse profile of the thread 33 which it is designed to reform. These cutting edges 41, having zero degree rake angle represented by the radial walls 38, and zero following clearance represented by the circumferential walls 39, obviously are incapable of cutting into the steel body of the tool joint in the manner of the ordinary tap or die. On the other hand, the thread reforming edges 41, moving along the flanks of threads 33 of a damaged box joint during the final advancement of the tool, are capable of scraping or scarfing the fortuitous bulges produced at damaged areas 30, 31, and 32 without penetrating the original profile of the thread. Due to the large number of thread lands 37, it is necessary to rotate the reforming tool only a relatively small angular distance, properly ½ or ¾ of a revolution. This has been found to be sufficient to cause the scarfing edges 41 to adequately cover the entire thread surfaces of a tool joint without leaving any unaffected portion of the thread flanks. However, since many of the scarfing edges 41 are in operation at once, very high torque must be applied to the reforming tools, for which the gear arrangement 19, 18, 14 is well adapted. The reason for this manner of operation of the reforming tool is that drill pipe threads are rather substantially tapered in accordance with the stabbing and run-up procedures to which they are subjected in making up drill strings for running into a well.

A great advantage of the reforming tool described is that, as soon as the threads on surfaces 39 of lands 37 fully and tightly intermesh with, i.e., seat against, box thread 33 being reformed, the resistance to turning of tool 26 and shaft 13 will increase sharply. This is reflected by torque meter 44 in position to be readily visible by the operator so that he can promptly stop motor 20. Alternatively, the torque meter may be readily interconnected with the motor controls so as to cut off the motor when the torque registered by the meter raises above a predetermined point. If tool head 26 were designed in the manner of an ordinary tap, e.g., with a rake angle at 38 and following clearance, the reforming edges 41 would proceed to cut into the steel of the box joint forming additional threading and reducing, at least in a slight degree, the flanks of threads 33. This is generally undesirable because these flanks, after repeated use in making up drill string, become quite hard due to work hardening. Moreover, where additional threads are cut in this manner, the original dimensions of the drill pipe will be correspondingly altered. The present tool does not have this disadvantage since it cannot cut additional threads, but, rather, promptly signals upon torque meter 44 the end of its effective work in restoring the original thread contour or profile.

The tool for reforming a pin joint thread, as in FIG. 2, would have a working head which is the reverse of head 26 in FIG. 4. Again, however, axial grooves would be provided in the thread surface, as at 46 in FIG. 5, forming thread lands 47. These lands will have radial faces 48 which, with the thread-like land crests 49, form scarfing edges 50 corresponding to edges 41 shown in FIG. 6. The functioning of this form is exactly the same as described in connection with FIG. 6, except, of course, the tool 51 is received about a tool joint pin thread and then is rotated by motor 20 and the gearing through a ½ or ¾ turn sufficient to tightly mesh the threads.

Experience has shown that the tools herein described are adequate to reform tool joint threads to their original profile to insure the threading facility and security of a new tool joint thread. Thus, upon rebuilding by welding of the cylindrical collar portions of the tool joints and reprofiling of the threads as herein described, many sections of drill pipe can be restored for long additional satisfactory usage at substantially less expense than is required for replacement of worn tool joints with new ones.

The invention may be modified in various respects as will occur to those skilled in the art, and the exclusive use of all modifications as come within the scope of the appended claims is contemplated.

I claim:

1. A tool for restoring the form of a tapered thread of predetermined form and size comprising a rigid, axially tapered body of generally circular cross section, helically disposed threading on said surface substantially duplicating said predetermined form and size, and a plurality of longitudinal slots in the surface of the body and spaced thereabout, said slots forming thread lands therebetween each having a circumferential surface and a radial longitudinal wall on the forward side thereof during advancement of the tool into a thread to be restored, each pair of said surfaces and walls intersecting in an axial cutting edge without rake or following clearance for removing fortuitous protrusions on the threads being restored by scarfing action without penetrating the normal contour thereof.

2. A thread restoring tool as described in claim 1 in which said threading has flattened crests disposed to seat on the complementary roots of threads being restored concurrently with seating of the flanks and roots of said tool threading on the flanks and crests of said latter threads for stopping advancement of the tool into said latter threads concurrently during the final advancement of the tool into said latter threads, said scarfing edges being disposed to traverse substantially the entire circumferential expanse of said latter threads during approach of said edges to said latter threads.

3. A tool as described in claim 2 in which said threading extends at least several pitch lengths along said body for simultaneously applying scarfing action to a commensurate expanse of the threads being restored.

References Cited

UNITED STATES PATENTS

| | | | |
|---|---|---|---|
| 568,277 | 9/1896 | Rall | 10—1.5 |
| 1,175,034 | 3/1916 | Woodward | 10—1.5 |
| 1,338,495 | 4/1920 | Donelson | 10—141 |
| 1,664,793 | 4/1928 | Schleinnger | 10—1.5 |
| 1,694,229 | 12/1928 | Nestor | 10—1.5 |
| 2,275,097 | 3/1942 | Webb | 10—141 |
| 2,379,908 | 7/1945 | Johnson | 10—141 |
| 2,556,174 | 6/1951 | Evans | 10—141 |
| 2,787,798 | 4/1957 | Rosan | 10—1 |
| 3,126,560 | 3/1964 | Jennings | 10—120 |
| 3,148,394 | 9/1964 | Berkey | 10—111 |
| 3,177,508 | 4/1965 | Scott et al. | 10—120 |

CHARLES W. LANHAM, Primary Examiner

E. M. COMBS, Assistant Examiner